(12) United States Patent
Stubbe

(10) Patent No.: US 7,641,426 B2
(45) Date of Patent: Jan. 5, 2010

(54) DEVICE FOR FIXING AN OBJECT TO A RAIL

(75) Inventor: Ingolf Stubbe, Gottmadingen (DE)

(73) Assignee: Allsafe Jungfalk GmbH & Co. KG, Engen (DE)

( * ) Notice: Subject to any disclaimer, the term of this patent is extended or adjusted under 35 U.S.C. 154(b) by 493 days.

(21) Appl. No.: 11/662,754

(22) PCT Filed: Sep. 28, 2005

(86) PCT No.: PCT/EP2005/010483

§ 371 (c)(1),
(2), (4) Date: Mar. 13, 2007

(87) PCT Pub. No.: WO2006/034855

PCT Pub. Date: Apr. 6, 2006

(65) Prior Publication Data

US 2008/0191115 A1 Aug. 14, 2008

(30) Foreign Application Priority Data

Sep. 28, 2004 (DE) .................... 20 2004 015 211 U
Mar. 11, 2005 (DE) .................... 20 2005 004 134 U

(51) Int. Cl.
*B60P 7/08* (2006.01)
(52) U.S. Cl. ...................................... 410/105; 410/104

(58) Field of Classification Search .................. 410/104, 410/105, 77, 80; 244/118.1, 118.6, 122 R; 248/503.1
See application file for complete search history.

(56) References Cited

U.S. PATENT DOCUMENTS

| 4,396,175 A | 8/1983 | Long et al. |
| 4,493,470 A | 1/1985 | Engel |
| 4,708,549 A * | 11/1987 | Jensen .................. 410/105 |
| 4,796,837 A | 1/1989 | Dowd |
| 5,871,318 A | 2/1999 | Dixon et al. |

FOREIGN PATENT DOCUMENTS

DE 202 18 780 4/2003

* cited by examiner

*Primary Examiner*—Stephen Gordon
(74) *Attorney, Agent, or Firm*—Bachman & LaPointe, P.C.

(57) ABSTRACT

A device for fixing an object to a rail by way of a fitting ($P_1$, $P_2$, $P_3$, $P_4$) that is movable along the rail within a groove together with a sliding member and is provided with a retainer which can be sunk into at least one lateral groove cavity in the rail. The retainer is joined to a sliding member via a connecting element. The retainer is supported relative to the sliding member and/or a rotating element via at least one energy accumulator while the pressurized retainer is fixed relative to the rail in at least two vertical positions.

17 Claims, 5 Drawing Sheets

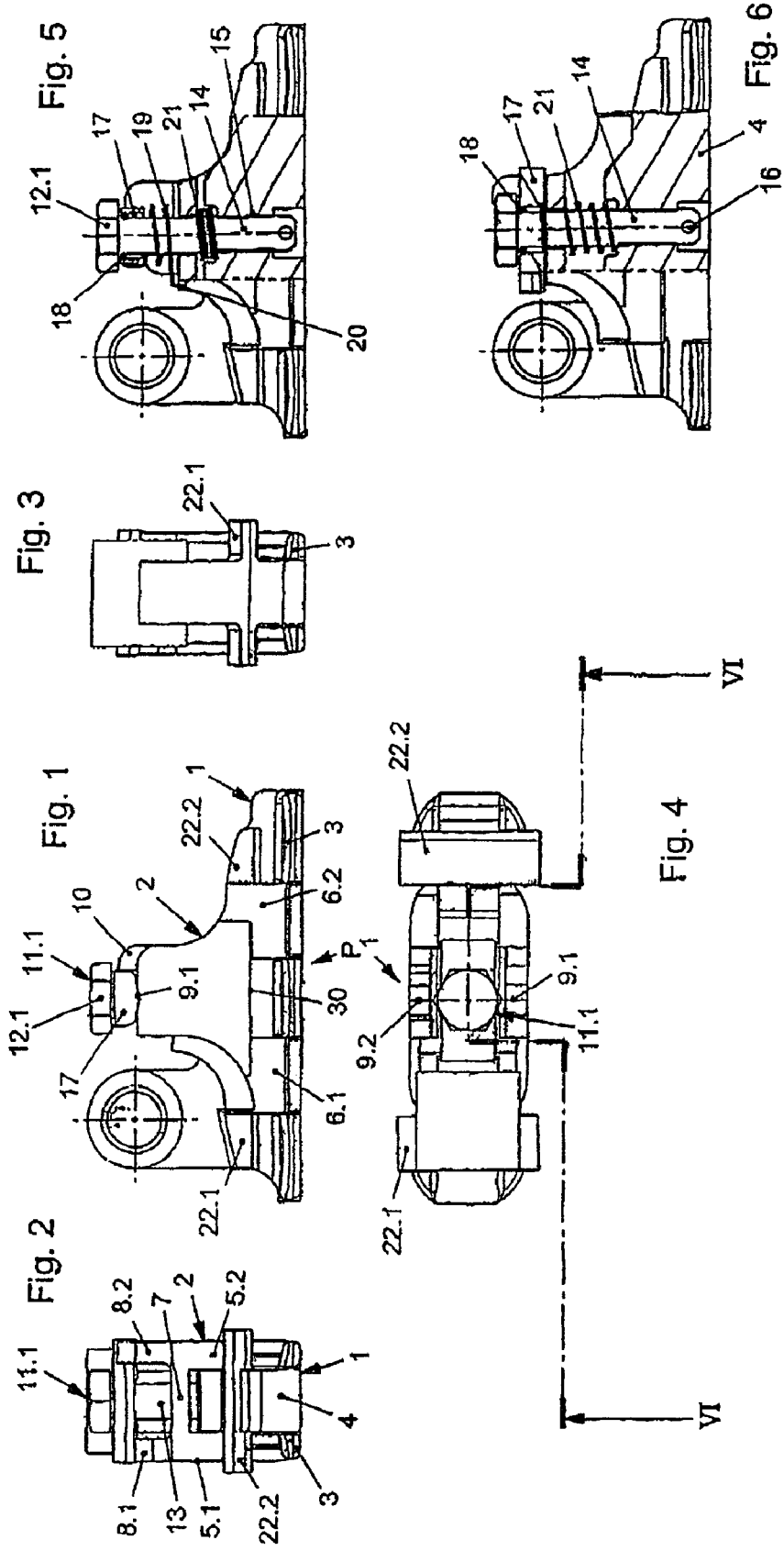

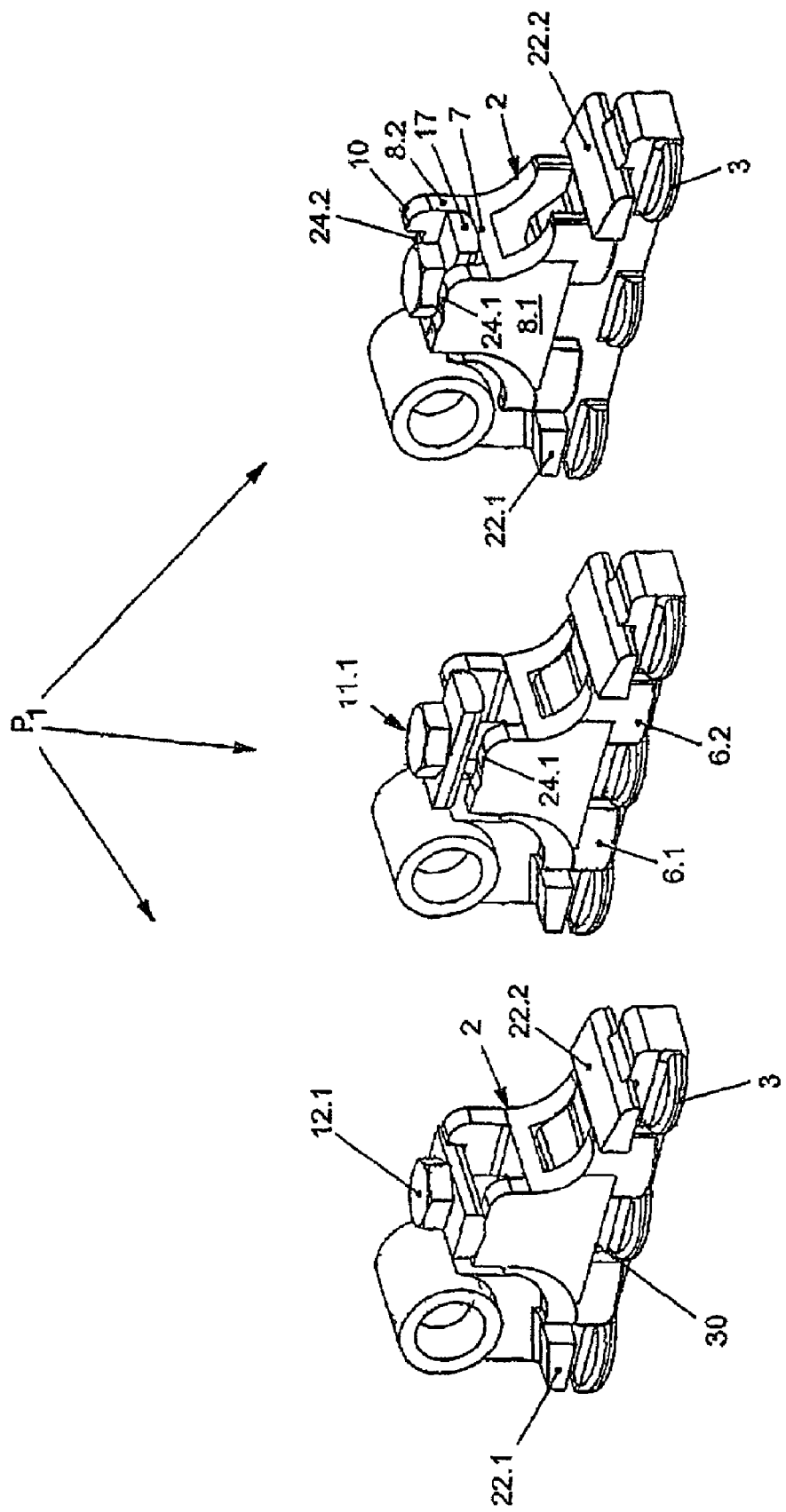

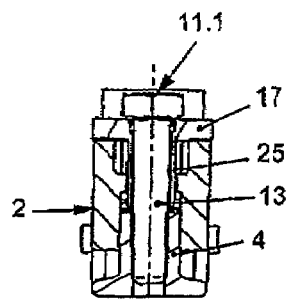
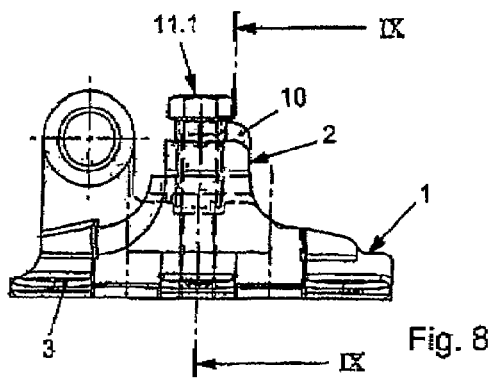
Fig. 9    Fig. 8
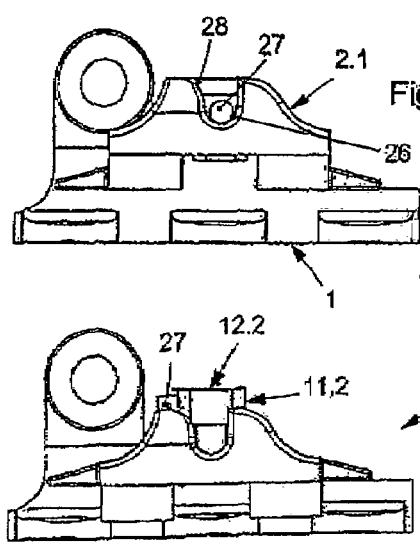
Fig. 10
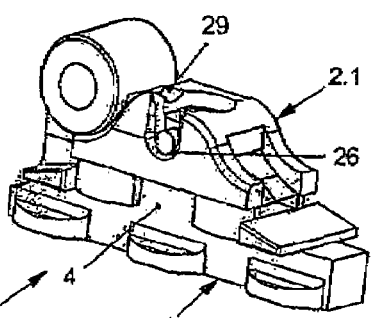
Fig. 11
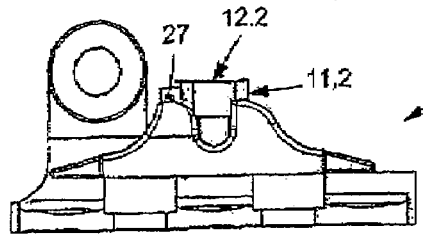
Fig. 12
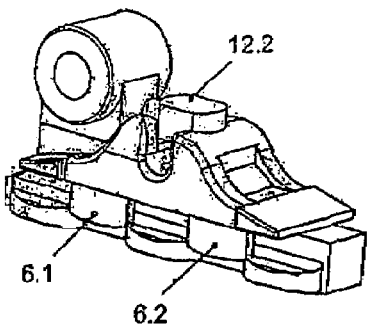
Fig. 13

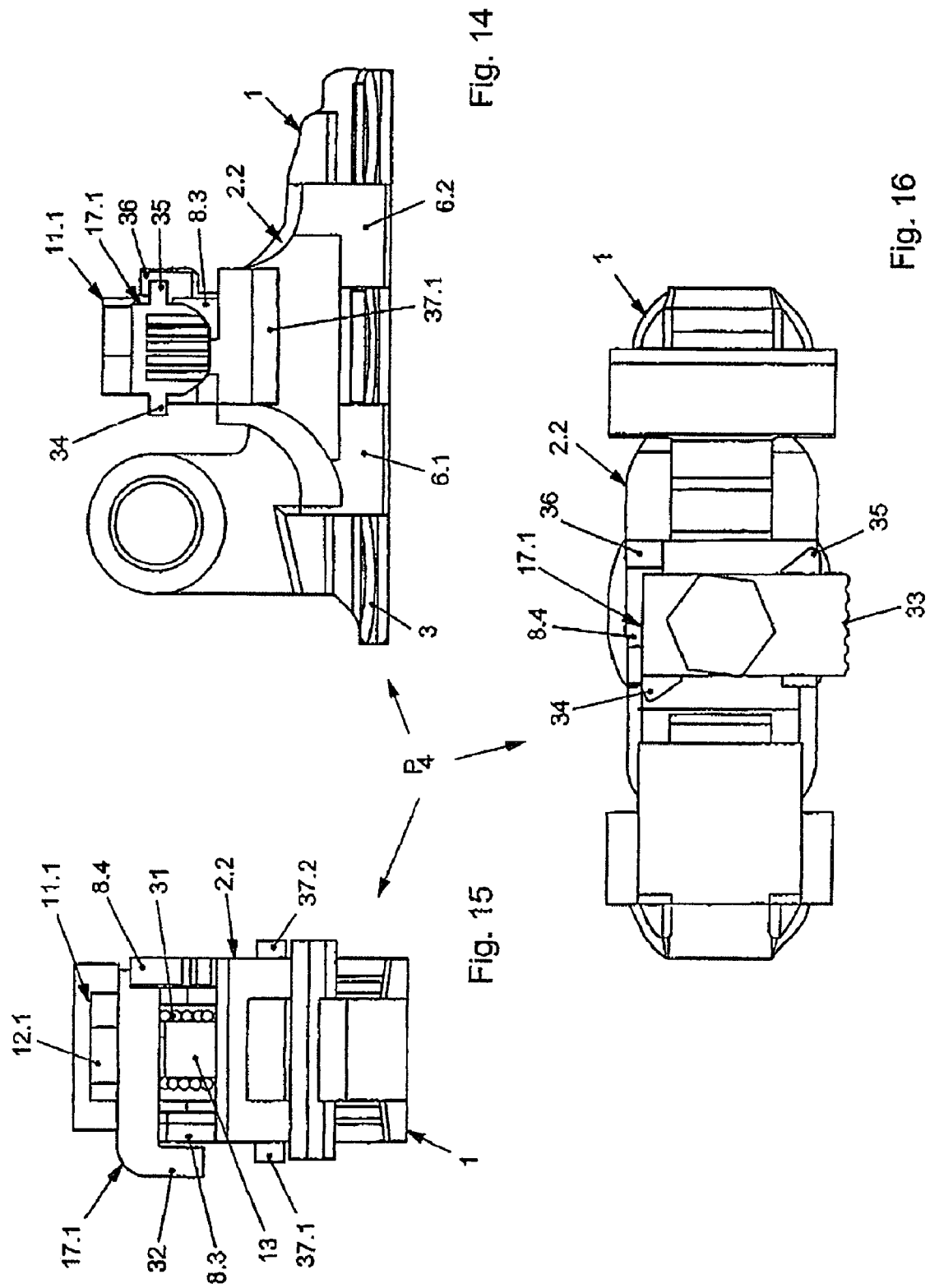

DEVICE FOR FIXING AN OBJECT TO A RAIL

The invention relates to a device for fixing an object to a rail by means of a fitting which is moveable with a sliding body along the rail in a groove and has a retainer which can be lowered into at least one lateral groove depression in the rail, with the retainer being connected by means of a rotatable connecting element to the sliding body.

PRIOR ART

The device according to the invention serves primarily for fixing aircraft seats to corresponding rails in an aircraft, though it should not be restricted to this when described in the following text on the basis of this example.

It is known that aircraft seats must very often be moved along rails depending on the number of passengers on the aircraft, and this should be capable of being carried out as quickly as possible. The subsequent fixing at a desired position must in turn be very reliable since the seats must comply with a certain specified acceleration and deceleration rate.

Most aircraft of said type are nowadays equipped with so-called airline rails, which are generally known. For a more detailed explanation of an airline rail, reference is made to DE 202 18 780 U1. The airline rail has an undercut groove for holding a sliding body, with corresponding depressions being formed at both sides in the free groove edges.

In order to fix seats to airline rails of said type, fittings are known which have the abovementioned sliding body which slides with lateral sliding shoes in the undercut groove and can be moved in said groove. In order to fix said sliding body, which also has a connecting element, at a specified point of the airline rail, a retainer is seated on the sliding body. Said retainer has lateral integrally formed humps between in each case two sliding shoes. If the retainer is lowered, then said humps move into the abovementioned edge depressions of the airline rail, so that a further movement of the fitting is then no longer possible.

Serving to lower and fix the retainer is a screw whose head presses on the retainer and thereby presses the retainer downward. The disadvantage of this is that a very long screw path must be covered, specifically both when lowering and raising the retainer. This requires an extremely large amount of time, is laborious and often has the effect that the fittings are not correctly fitted to the airline rail so that the fitting can rattle or even come loose. This is extremely undesirable.

OBJECT

An object of the present invention is to provide a device of the above specified type in which the fittings can be quickly loosened and quickly fixed again at another desired point.

ACHIEVEMENT OF THE OBJECT

The object is achieved in that the retainer is supported relative to the sliding body and/or relative to a rotary element by means of at least one force store and holds the pressurized retainer fixedly in at least two height positions relative to the rail.

As stated above, the present invention is used primarily for fixing fittings to an airline rail, this being primarily for moving aircraft seats.

A coil spring lends itself to use as a force store, though a leaf spring or the like could also be used. In the case of a coil spring being selected, it is most favorable for said coil spring to surround the connecting element as the coil spring is supported internally at the same time in this way.

The connecting element should preferably have a polygonal head, so that it can be gripped by a corresponding tool socket.

In one simple exemplary embodiment of the invention, a transverse bar projects from the connecting element, in particular from the polygonal head of the connecting element, which transverse bar, in the movement position of the fitting, engages into a depression in the retainer. The polygonal head is thereby simultaneously countersunk into the retainer.

The depression preferably forms a rising face for the transverse bar to slide on, with the rising face leading to a latching depression which runs rotated approximately 90° relative to the depression.

If, in said exemplary embodiment, the retainer is pressed down by hand, the polygonal head projects out of the retainer. A socket is placed on the polygonal head, by means of which socket the polygonal head is rotated by 90°. The transverse bar then engages into the latching depression and the retainer can then no longer move out of its latched position with the airline rail.

In an improved exemplary embodiment of the invention, a rotary plate is arranged on the connecting element. Said rotary plate is designed so as to be held in the retainer in the movement position of the fitting. If the retainer, however, in order to fix the fitting, is pressed down by hand counter to the force of a spring or by a spring, the rotary plate projects out of the retainer and can then be rotated by 90°. Here, the rotary plate engages over the retainer, so that the latter can no longer return into the movement position.

If the connecting element, for example a threaded bolt, which extends through the retainer and engages with a threaded section in a threaded bore in the sliding body, is then rotated downward, the rotary plate likewise presses the retainer downward, and at the same time, the sliding body is tightened, so that the fitting is fixed as a result of the edge strips of the airline rails being clamped between the sliding shoes and a lower edge of the retainer. Rattling noises are avoided in this way.

As stated above, the retainer can be pressed downward either counter to the force of a spring or by a spring. In the first case, the fitting is moved to a desired position and the retainer is then pressed downward counter to the force of the spring, so that corresponding retainer humps can move into depressions of the airline rail. In this case, two hands are necessary, since the retainer must be pressed downward and the rotary plate must be rotated over side strips of the retainer.

In the other exemplary embodiment, only one hand is necessary, since the retainer is held in the open position, and can be moved along the airline rail, by means of a corresponding design of the rotary plate. For this purpose, corresponding latching lugs or stop lugs are provided on the rotary plate, which latching lugs or stop lugs sit in latching depressions in the side strips of the retainer and hold the latter in the open position.

If the desired position is then reached, the rotary plate need only be rotated by about 90°, with the latching lugs or stop lugs sliding out of the latching depressions and releasing the retainer. The retainer moves downward under the pressure of the coil spring and is seated on the airline rail. The fitting can then be moved slightly, so that the retainer then moves under the pressure of the coil spring with its humps into the airline depressions.

The rotation of the rotary plate can on the one hand be assisted in that the rotary plate is supported on a sleeve which prevents the rotary plate creeping downward along the shank of the connecting element. In said exemplary embodiment, an adhesive ring is also preferably provided between the polygonal head and the rotary plate, which adhesive ring drives the rotary plate as the connecting element is rotated.

Better still, however, is the arrangement of a rotary spring between the rotary plate and the sliding body. Said rotary spring causes an automatic rotation of the rotary plate when the retainer is pushed down, which rotation can only be stopped by a stop on the upper side of the retainer. In this case, just one hand is sufficient to position and fix the fitting on and to the airline rail. This is particularly advantageous for the present invention.

The connecting element is designed so as to hold the retainer and the sliding body together in all positions. For this reason, the connecting element also extends, with a shank or threaded section, through the sliding body, and is provided at its free protruding end with a pin which prevents the connecting element sliding out of a bore or threaded bore in the sliding body. At the same time, said pin also serves as an end position delimitation when unscrewing the connecting element, so that the screw path can be kept very short in any case.

The present invention has the effect that the installation or relocation time of seats in an aircraft is considerably reduced. This provides a considerable cost saving.

DESCRIPTION OF THE FIGURES

Further advantages, features and details of the invention can be gathered from the following description of preferred exemplary embodiments and on the basis of the drawing, in which:

FIG. 1 shows a side view of a fitting according to the invention for fixing an object, for example an aircraft seat, to an airline rail (not shown in any more detail);

FIG. 2 shows an end view of the fitting as per FIG. 1;

FIG. 3 shows another end view of the fitting as per FIG. 1;

FIG. 4 shows a plan view of the fitting as per FIG. 1 with the rotary plate rotated about 90°;

FIG. 5 shows a cross section through the fitting as per FIG. 1;

FIG. 6 shows a cross section through the fitting as per FIG. 4 along line VI-VI;

FIG. 7 shows three perspective views of the fitting as per FIGS. 1 and 4 in different use positions;

FIG. 8 shows a side view of a further exemplary embodiment of a fitting corresponding to FIG. 1;

FIG. 9 shows a cross section through the fitting as per FIG. 8 along line IX-IX;

FIG. 10 shows a side view of a further exemplary embodiment of a fitting;

FIG. 11 shows a perspective view of the fitting as per FIG. 10;

FIG. 12 shows a side view of the fitting corresponding to FIG. 10 in another use position;

FIG. 13 shows a perspective view of the fitting as per FIG. 12;

FIG. 14 shows a side view of a further exemplary embodiment of a fitting according to the invention;

FIG. 15 shows a front view of the fitting as per FIG. 14;

FIG. 16 shows a plan view of the fitting as per FIG. 14;

In FIG. 1, a fitting $P_1$ according to the invention has a sliding body 1 on which the retainer 2 is seated in the manner of a rider. The sliding body 1 has laterally projecting sliding shoes 3, with in each case three sliding shoes 3 being provided in the exemplary embodiments shown. The sliding body 1 is held with said sliding shoes 3 in a groove of a rail, in particular of an airline rail, and can slide in said groove. The sliding shoes 3 are preferably integrally connected to an inner body 4 of the sliding body 1, on which inner body 4, as stated above, the retainer 2 is seated. Here, the retainer 2 engages, as shown in FIG. 2, over the inner body 4 in a U-shape with two limb-like side walls 5.1 and 5.2 which have in each case two humps 6.1 and 6.2 which can be better seen in FIG. 7. The humps 6.1 and 6.2 are situated in each case between two sliding shoes 3.

Figure 18:
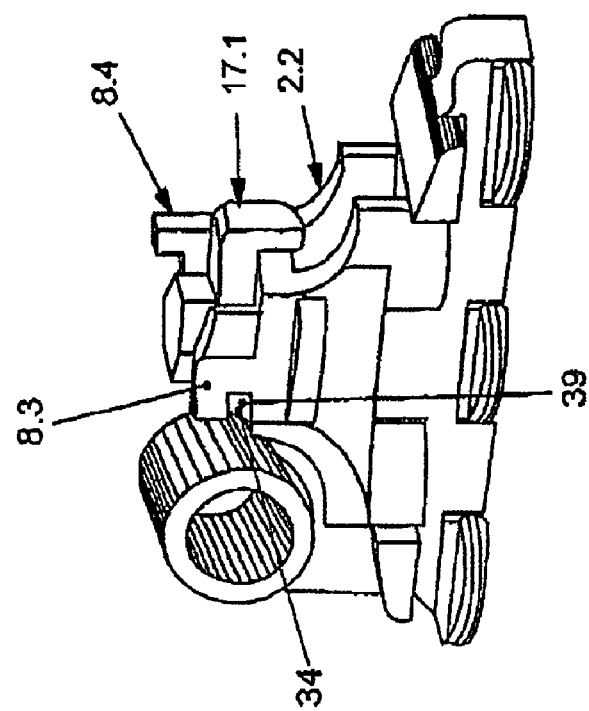
FIGS. 17 and 18 show perspective views of the fitting as per FIG. 14 in the open position.

Both side walls 5.1 and 5.2 are connected to one another by means of a transverse wall 7, with it being possible for the transverse wall 7 to abut against the surface of the inner body 4. Two side strips 8.1 and 8.2 project upward from the transverse wall 7, in the end edges 24.1, 24.2 of which side strips 8.1 and 8.2 in each case one notch 9.1 and 9.2, as can be seen in FIG. 4, can be formed. In addition, a further stop 10 projects from the side strips 8.2.

The transverse wall 7 is penetrated between the two edge strips 8.1 and 8.2 by a connecting element 11.1. The latter has a polygonal head 12.1 which is adjoined by a shank 13 which engages with a threaded section 14, shown in FIGS. 5 and 6, into a threaded bore 15 in the sliding body 1. The threaded section 14 extends through the threaded bore 15 and is penetrated outside the threaded bore 15 by a pin 16 or the like.

Seated on the shank 13 below the polygonal head 12.1 is a retaining plate 17 which is supported by means of an O-ring-shaped adhesive ring 16 against the underside of the polygonal head 12.1.

At the other side, the retaining plate 17 is connected to a rotary spring 19 which is fixed with its free end 20 in the transverse wall 7.

In addition, the retainer 2 is supported by means of its transverse wall 7 against a coil spring 21 which, at the other end, abuts against the inner body 4.

Also to be seen on the inner body 4, on both sides of the retainer 2, are two wings 22.1 and 22.2 which slide along on the rail outside the groove. In addition, a fastening sleeve 23 projects from the inner body 4, into which fastening sleeve 23 can be inserted a corresponding projection of an aircraft seat.

The functioning of the present invention is described in more detail on the basis of FIG. 7.

The initial position of the fitting $P_1$ is shown in the right-hand illustration. In said initial position, the retainer 2 is released, that is to say, the rotary plate 17 is held between the two side strips 8.1 and 8.2 and rests on the transverse wall 7. The coil spring 21 is, as shown in FIG. 6, relaxed. In contrast, the rotary spring 19 is compressed.

The fitting $P_1$ is now moved to a desired point of the airline rail, with the fitting $P_1$ being guided by the sliding shoe 3 and the wings 22.1 and 22.2. Once the desired point is reached, the retainer 2 is pressed downward counter to the pressure of the coil spring 21, so that the humps 6.1 and 6.6 engage in corresponding side depressions of the airline rail. The retainer is thereby fixed to the rail and can no longer be moved along the rail, since the surfaces of the humps 6 correspond to the depression inner face.

As the retainer 2 is moved downward, the rotary spring 19 is also released, so that the latter can exert a rotary action on the rotary plate 17 at the moment when the latter moves beyond the end edges 24.1 and 24.2 of the side strips 8.1 and 8.2. When it rotates, the rotary plate 17 abuts against the stop 10 and can be rotated no further.

If the connecting element 11.1 is then moved downward by being rotated, it exerts a pressure on the rotary plate 17, so that the latter moves into the notches 9.1 and 9.2 and the retainer 2 is pressed under. At the same time, the sliding body 1 is tightened, so that the edge of the airline rail is clamped between the sliding shoes 3 and a projecting lower edge 30. The fitting $P_1$ can then no longer rattle.

It is also possible in one exemplary embodiment for the rotary spring 19 to be dispensed with, with the rotary plate 17 being driven by the adhesive ring 18. Said rotary plate 17 is then rotated with the rotation of the fastening element 11.1 until the rotary plate 17 bears against the stop 10.

This lends itself to use primarily in the exemplary embodiment of a fitting $P_2$ as per FIGS. 8 and 9, in which a sleeve 25 as a position holder is placed onto the shank 13 of the fastening element 11.1 between the retaining plate 17 and the inner body 4. Said sleeve 25 is designed in terms of its length such that, as the retainer 2 is moved downward, said sleeve 25 holds the retaining plate 17 at a height which ensures that the retaining plate 17 can engage over the end edges 24.1 and 24.2 of the side strips 8.1 and 8.2. The rotation of the retaining plate 17 is assisted here primarily by the adhesive ring 18 which, as the fastening element 11.1 is rotated, drives the retaining plate 17 with it as far as the stop 10.

FIGS. 10 to 13 show a simple exemplary embodiment of a fitting $P_3$. Here, too, a retainer 2.1 is seated on a sliding body 1 and is supported by means of a spring (not shown in any more detail) against the inner body 4 of the sliding body 1. However, the retainer 2.1 has a depression 26 which serves to hold a transverse bar 27. Said transverse bar 27 projects from a polygonal head 12.2 of a connecting element 11.2 which can be held in the retainer 2.1. A side wall of the depression 26 is designed as a rising face 28 which guides the transverse bar to a latching depression 29.

In order to fix said fitting $P_3$, the retainer 2.1 is likewise pressed downward until the polygonal head 12.1 appears out of the retainer, as shown in FIGS. 12 and 13. Using a corresponding socket, the polygonal head 12.2 can then be rotated by 90° and then rests in the latching depression 29, so that the retainer 2.1 is fixed in the lowered position. In said lowered position, the humps 6.1 and 6.2 engage, as described in more detail above, into the depression of the airline rail.

Said latched position is released by means of an opposite rotation of the polygonal head 12.2, wherein the transverse bar 27 can then move back into the depression 26 and the retainer 2.1 is raised as the spring is relaxed.

The pin 16 also serves to ensure that the connecting element 11.1 and 11.2 cannot move out of its retained position with the sliding body 1. Said pin 16 however also serves to define an upper end position, so that in particular the connecting element 11.1 cannot be inadvertently unscrewed too far such that an excessively long screw path must be traveled when fixing the fitting $P_1$ again.

The exemplary embodiment of a further fitting $P_4$ as per FIGS. 14 to 18 differs substantially in that the coil spring 21 is omitted. Instead, only one coil spring 31 is provided, so that a retainer 2.2 is pressed downward onto the sliding body 1.

The coil spring 31 surrounds the connecting element 11.1 and is supported at the other side of the retainer 2.2 against a rotary plate 17.1. The latter is in turn arranged between the coil spring 31 and the polygonal head 12.1 and can be rotated about the shank 13. Said rotary plate 17.1 has an angled grip lug 32 which is provided with a corrugated portion 33 which can be seen in FIG. 16. Said grip lug 32 also has two approximately diagonally opposite lugs, with one lug being formed as a latching lug 34, and the other being formed as a stop lug 35.

Figure 17:
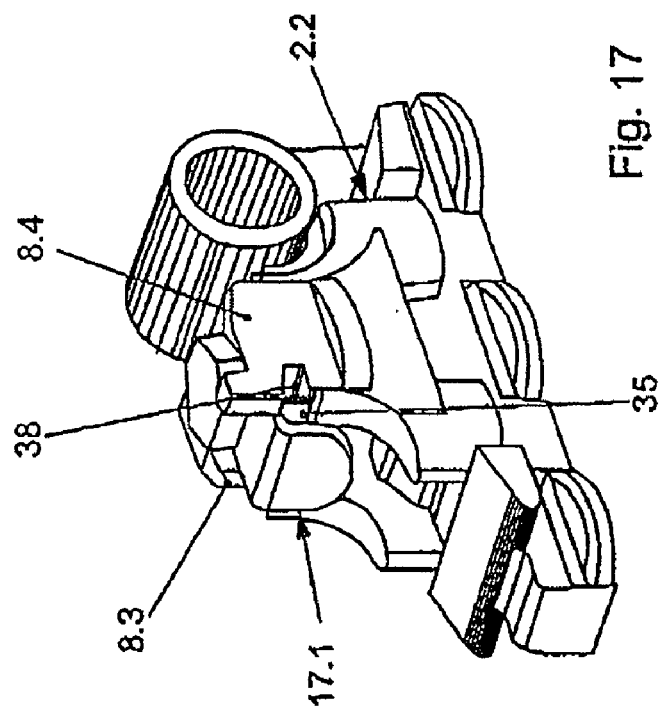

The functioning of said fitting $P_4$ is described with additional reference to FIGS. 17 and 18:

In the locked state, the fitting $P_4$ is in the initial position shown in FIGS. 14 to 16. The rotary plate 17.1 is positioned transversely, so that the grip lug 32 engages over a side wall 8.3 of the retainer 2.2 and presses the rotary plate 17.1 both against said side wall 8.3 and against an opposite side wall 8.4. The retainer 2.2 is under the pressure of the coil spring 31 and under the pressure of the rotary plate 17.1, so that as the connecting element 11.1 is rotated, the pressure on the retainer 2.2 by means of the polygonal head 12.1 and the rotary plate 17.1 is increased. The humps 6.1 and 6.2 are situated in the depressions of an airline rail, and the sliding shoes 3 are seated in the airline rail, so that the airline rail is clamped between the sliding shoes 3 and the retainer 2.1. The fitting $P_4$ is absolutely fixed in this way.

If the fitting $P_4$ is to be moved, firstly the connecting element 11.1 is released, so that the rotary plate 17.1 becomes freely rotatable. The rotary plate 17.1 is then rotated counterclockwise until the stop lug 35 abuts against a stop 36. The interaction of the stop 36 and the stop lug 35, or the width of the rotary plate 17.1, are selected such that in said stop lug the retainer 2.2 can be raised counter to the force of the coil spring 31, so that the side walls 8.3 and 8.4 hold the rotary plate 17.1 between them. The raising of the retainer 2.2 is facilitated by two lateral grip strips 37.1 and 37.2.

The retainer 2.2 is raised until the stop lug 35 can move into a latching depression 38, shown in FIG. 17, in the side strip 8.4, and at the same time the latching lug 34 can move into a latching depression 39 in the side strip 8.3. In this way, the retainer 2.2 is fixed at said height by the rotary plate 17.1, so that the fitting $P_4$ can be moved along the airline rail.

Once the fitting $P_4$ has reached the desired point along the airline rail, a rotation of the rotary plate 17.1 clockwise is sufficient, so that the latching lug and the stop lug move out of their latching depressions 38 and 39 and the retainer 2.2 is pressed downward against the airline rail under the pressure of the coil spring 31. The fitting $P_4$ can then be moved along the airline rail until the humps 6.1 and 6.2 have reached corresponding formations in the airline rail, with the humps 6.1 and 6.2 then automatically sliding under the pressure of the coil spring 31 into said depressions.

It is now possible for the rotary plate 17.1 to be rotated clockwise again by approximately 90°, so that the rotary plate 17.1 engages over the two side strips 8.3 and 8.4. The connecting element 11.1 can now be retightened. The fitting $P_4$ is thereby locked at said point.

The invention claimed is:

1. A device for fixing an object to a rail by means of a fitting ($P_1$, $P_2$, $P_3$, $P_4$) which is moveable with a sliding body (1) along the rail in a groove and has a retainer (2, 2.1, 2.2) which can be lowered into at least one lateral groove depression in the rail, with the retainer (2, 2.1, 2.2) being connected by means of a connecting element (11.1, 11.2) to the sliding body (1), wherein the retainer (2, 2.1, 2.2) is supported relative to the sliding body (1) and/or relative to a rotary element (17, 17.1, 27) by means of at least one force store (19, 21, 31) and holds the retainer (2, 2.1, 2.2), as pressurized, fixedly in at least two height positions relative to the rail.

2. The device as claimed in claim 1, wherein the rail is a rail in an airplane.

3. The device as claimed in claim 2, wherein the force store is a coil spring (19, 21, 31).

4. The device as claimed in claim 3, wherein the coil spring (19, 31) surrounds the connecting element (11.1, 11.2).

5. The device as claimed in claim 1, wherein the connecting element (11.1, 11.2) has a polygonal head (27).

6. The device as claimed in claim 1, wherein a transverse bar (27) projects from the connecting element (11.2), which transverse bar (27) engages into a depression (26) in the retainer (2.1).

7. The device as claimed in claim 6, wherein the depression (26) has a rising face (28) for the transverse bar (27) to slide on.

8. The device as claimed in claim 7, wherein the rising face (27) leads to a latching depression (29) which runs rotated approximately 90° relative to the depression (26).

9. The device as claimed in claim 5, wherein a rotary plate (17, 17.1) is arranged on the connecting element (11.1).

10. The device as claimed in claim 9, wherein the rotary plate (17, 17.1) is assigned a stop (10, 36), and/or at least one latching notch (9.1, 9.2) or latching depression (38, 39), on the retainer (2.1, 2.2).

11. The device as claimed in claim 10, wherein two opposite latching or stop lugs (34, 35) are provided on the rotary plate (17.1), to which latching or stop lugs (34, 35) are assigned latching depressions (38, 39) in side strips (8.3, 8.4) of the retainer (2.2).

12. The device as claimed in claim 10, wherein the rotary plate (17.1) is provided with a grip lug (32).

13. The device as claimed in claim 9, wherein an adhesive ring (18) is provided between the rotary plate (17) and the polygonal head (12.1).

14. The device as claimed in claim 9, wherein a rotary spring (19) is arranged below the rotary plate (17), which rotary spring (19) engages at one end on the rotary plate and is connected at another end to the sliding body (1).

15. The device as claimed in claim 9, wherein a sleeve (25) is arranged below the rotary plate (17), which sleeve (25) is supported at one side against the sliding body (1).

16. The device as claimed in claim 1, wherein the connecting element (11.1) has a threaded section (14), by means of which said connecting element (11.1) engages into a threaded bore (15) in the sliding body (1).

17. The device as claimed in claim 16, wherein the threaded section (14) engages through the threaded bore (15) and, beyond the threaded bore (15), is penetrated by a pin (16).

* * * * *